Patented Feb. 22, 1927.

1,618,316

UNITED STATES PATENT OFFICE.

FILIP THARALDSEN, OF CHRISTIANIA, NORWAY.

PROCESS OF ELECTRIC SMELTING.

No Drawing. Application filed October 1, 1923, Serial No. 665,948, and in Norway September 23, 1922.

In process of electric zinc smelting it is in many cases of great advantage to use an acid slag bath as heating resistance.

In carrying out zinc smelting in this way difficulties very often occur from irregular behaviour of the slag bath and I have ascertained that the chemical composition of the slag is of very great importance to the efficiency of the bath as heating resistance.

I have made experiments with slags relatively high in iron and silica and I have obtained a very marked favourable effect, when the composition of the slag is kept within the following limits: 15-25% of iron, 45-60% of silica.

With a resistor comprising a slag very rich in iron beyond 25%, a very remarkable vivid motion is observed in the slag bath, in some cases of such violence that particles of slag are thrown out of the bath and are scattered about. If on the other hand the iron content of the slag is below the limit of 15% indicated above, the electric resistance of the slag bath becomes very high.

A content of silica in the slag beyond the maximum given above makes it difficult to keep the slag in the proper liquid condition, while with a silica content of less than 45% of the slag will retain much zinc and therefore cause loss of metal.

I claim—

In the art of electrically smelting zinc, a resistor consisting of a bath comprising an acid slag containing 15-25 percent iron and 45-60 percent silica.

In witness whereof I affix my signature.

FILIP THARALDSEN.